US005667736A

United States Patent [19]

Chien

[11] Patent Number: 5,667,736

[45] Date of Patent: Sep. 16, 1997

[54] METHOD OF MAKING A LASER GENERATED LIGHTING FIXTURE

[76] Inventor: Tseng Lu Chien, 8F, No. 29, Alley 73, Lin-Shon Street, Shi-Chi Town, Taipei, Hseng, Taiwan

[21] Appl. No.: 385,122

[22] Filed: Feb. 7, 1995

[51] Int. Cl.$^6$ .............................. B29D 11/00

[52] U.S. Cl. .............................. 264/2.5; 264/1.37; 264/1.9; 362/299; 362/300

[58] Field of Search .............................. 264/1.9, 2.5, 1.1, 264/322, 1.31, 1.37, 1.32, 1.34; 425/808; 362/299, 300

[56] References Cited

U.S. PATENT DOCUMENTS

| | | | |
|---|---|---|---|
| 1,231,710 | 7/1917 | Comstock . | |
| 2,907,249 | 10/1959 | Hjermstad . | |
| 3,513,305 | 5/1970 | Joncas . | |
| 3,581,275 | 5/1971 | Petersen | 340/25 |
| 3,588,492 | 6/1971 | Pollock . | |
| 3,611,603 | 10/1971 | Gessner . | |
| 3,694,945 | 10/1972 | Detiker . | |
| 4,536,833 | 8/1985 | Davis . | |
| 4,545,000 | 10/1985 | Fraley et al. | 362/304 |
| 4,704,666 | 11/1987 | Davis . | |
| 4,716,506 | 12/1987 | Shang | 362/293 |
| 4,994,948 | 2/1991 | Cooch | 362/346 |
| 5,013,494 | 5/1991 | Kubo et al. | 264/2.5 |
| 5,071,597 | 12/1991 | D'Amato et al. | 264/1.7 |
| 5,431,862 | 7/1995 | Win | 264/322 |

FOREIGN PATENT DOCUMENTS

| | | | |
|---|---|---|---|
| 460990 | 6/1952 | Italy | 362/326 |

OTHER PUBLICATIONS

"Quattro"brochure; Schonbeck Worldwide Lighting Inc. Dallas, Texas; 4 pages, undated.

"Lamps Plus Jan. Sale" ad; pp. 1, 4, 6, 8; Jan. 1992.

*Primary Examiner*—Mathieu D. Vargot

*Attorney, Agent, or Firm*—Bacon & Thomas

[57] ABSTRACT

A lighting fixture includes a grating of discontinuities that is integrally molded in a translucent member for spatially modulating light from a light source of the fixture. A translucent lens forms an outer envelope portion of the fixture, the grating being mounted between the light source and the lens. A reflector mounted opposite the light source from the grating enhances light transmission through the grating. A semi-reflective shell member in front of the light source, used alone or in combination with a geodesicly segmented reflector opposite the light source, greatly enhances the visual effects of the fixture by projecting multiple images of the light source through the grating. A mold for molding the grating includes a large plurality of metallic grating lines corresponding to a diffraction pattern for defining the grating surface; a metallic substrate rigidly connecting the grating lines; a cavity member for defining portions of a mold cavity, the substrate being connected to the cavity member with the grating lines facing the cavity and defining at least a portion of the cavity, whereby the grating surface forms a multiplicity of surface discontinuities on a molded article.

10 Claims, 2 Drawing Sheets

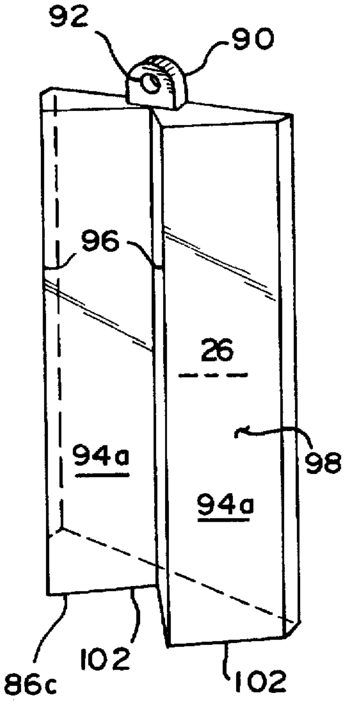
FIG. 15
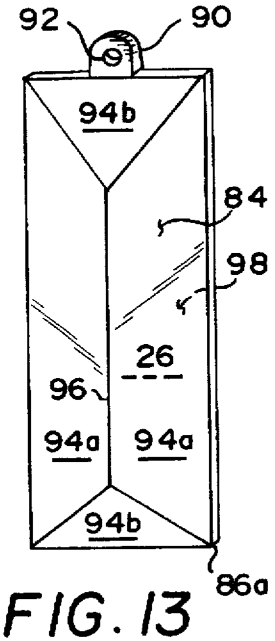
FIG. 13
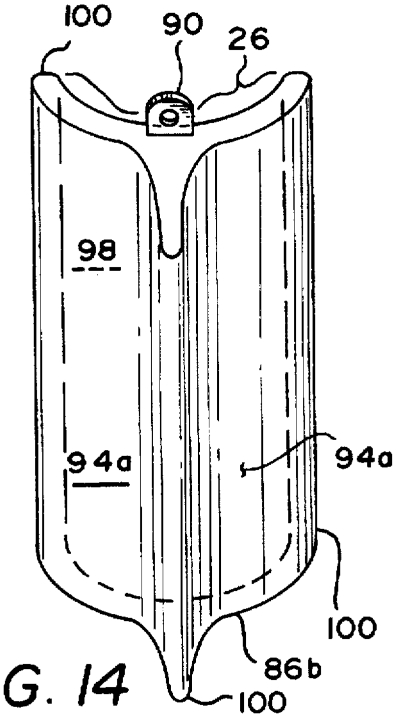
FIG. 14
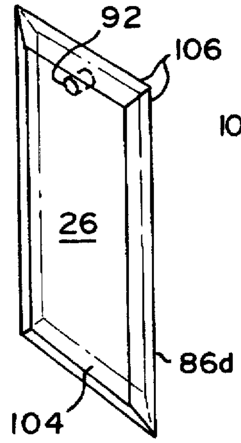
FIG. 16
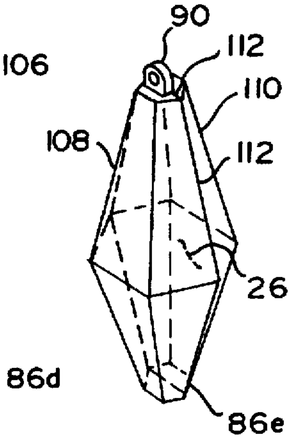
FIG. 17
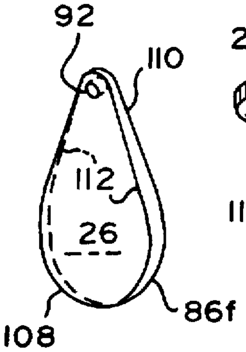
FIG. 18
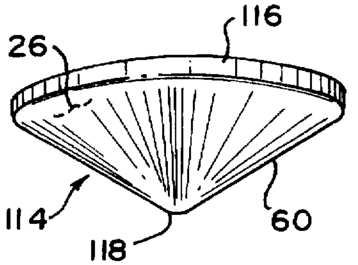
FIG. 20
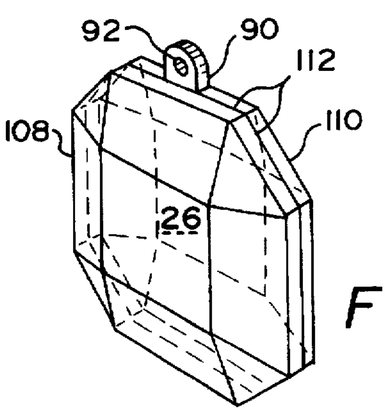
FIG. 19
FIG. 12
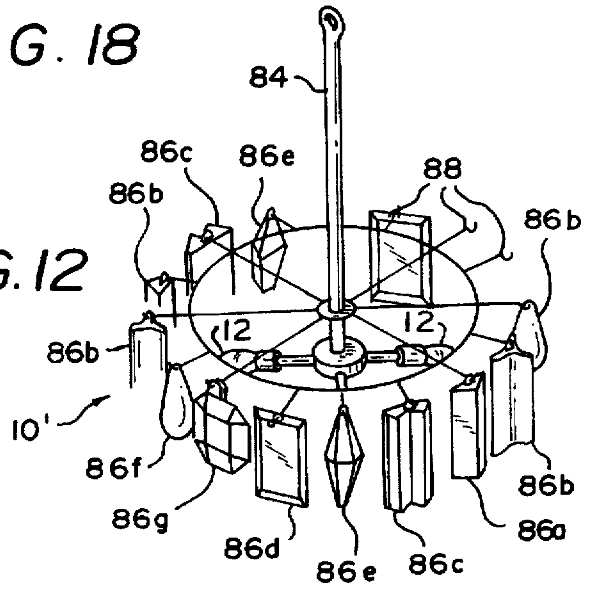

METHOD OF MAKING A LASER GENERATED LIGHTING FIXTURE

BACKGROUND

The present invention relates to decorative lighting fixtures, and more particularly to garden and other outdoor lighting fixtures, as well as indoor fixtures such as chandeliers, sconces and special purpose decorations such as Christmas tree lights and night lights.

Traditional crystal-light fixture lenses produce rainbow effects by refraction of light as the light passes through various prismaticly shaped portions of the lens. It has also been discovered that rainbow effects can be produced by etching or otherwise forming grating patterns on ordinary glass or plastic. Methods for producing these gratings in the prior art for simulating the effects of prismatic crystal lenses are unfortunately labor intensive in that they require cutting, sandblasting, etc. Also, the visual effects that are produced by such substitutes are significantly poorer than the traditional crystal lens fixtures.

Thus there is a need for decorative lighting fixtures that provide visual effects at least comparable to those produced by prismatic crystal lenses and that can be mass produced at low cost.

SUMMARY

The present invention meets this need by providing a decorative lighting fixture that produces visual effects at least comparable to those produced by prismatic crystal lenses. In one aspect of the invention, the fixture includes a light source; and a translucent grating member having a grating of discontinuities integrally molded thereon for spatially modulating light from the light source, a multiplicity of the discontinuities having a spacing of between approximately $0.5\times10^{-6}$ m and approximately $100\times10^{-6}$ m. The fixture can further include a translucent lens member that forms an outer envelope portion of the fixture, the grating member being mounted between the light source and the lens member. The grating member can be integrally formed with the lens member. The lens member can be formed from a clear, transparent material.

The fixture can include a pair of the grating members on opposite sides of the light source. The fixture can include a pair of the lens members on opposite sides of the light source, the lens member defining a star-shaped envelope portion of the fixture, the fixture further including a tubular base portion for support by an upper tree extremity.

The fixture can further include a reflector member that is mounted opposite the light source from the grating member and having a concave reflective surface that faces the light source for enhancing light transmission through the grating member. The reflector member can form a quasi-hemispherical rear envelope portion of the fixture. The reflector member can be segmented for directing multiple images of the light source through the grating member. Preferably the reflective surface of the reflector member has a geodesic plurality of reflective portions for producing multiple images of the light source. Accordingly the colored effects that are generated by the fixture are greatly enhanced.

The fixture can further include segmented, partially reflective shell member at least partially enclosing the light source for projecting the light source onto particular locations on the grating surface from a plurality of directions. The shell member can have a polygonal tubular cross section or a star-shaped cross section. Preferably at least some segments of the shell member are located in parallel spaced relation for multiply reflecting the light source therebetween, thereby further compounding a quantity of images of the light source that are projected through the grating surface. The discontinuities can have a depth of from approximately $0.1\times10^{-6}$ m to approximately $100\times10^{-6}$ m.

In another aspect of the invention, a mold apparatus for molding a translucent grating member includes a large plurality of metallic grating lines corresponding to a diffraction pattern for defining a molded grating surface, a multiplicity of the grating lines having a spacing of between approximately $0.5\times10^{-6}$ m and approximately $100\times10^{-6}$ m; a metallic substrate member rigidly connecting the grating lines; a cavity member for defining portions of a mold cavity; means for fixedly connecting the substrate to the cavity member with the grating lines facing the mold cavity and defining at least a portion of the mold cavity, whereby the grating surface forms a multiplicity of surface discontinuities on an article molded by the apparatus. The grating lines can have a depth of from approximately $0.1\times10^{-6}$ m to approximately $100\times10^{-6}$ m.

DRAWINGS

These and other features, aspects, and advantages of the present invention will become better understood with reference to the following description, appended claims, and accompanying drawings, where:

FIG. 12 is an oblique elevational perspective of a chandelier fixture incorporating features of the fixture of FIG. 1;

FIG. 13 is an oblique elevational perspective detail view of a portion of the fixture FIG. 12;

FIG. 14 is a perspective view as in FIG. 13, showing another portion of the fixture of FIG. 12;

FIG. 15 is a perspective view as in FIG. 13, showing another portion of the fixture of FIG. 12;

FIG. 16 is a perspective view as in FIG. 13, showing another portion of the fixture of FIG. 12;

FIG. 17 is a perspective view as in FIG. 13, showing another portion of the fixture of FIG. 12;

FIG. 18 is a perspective view as in FIG. 13, showing another portion of the fixture of FIG. 12;

FIG. 19 is a perspective view as in FIG. 13, showing a further portion of the fixture of FIG. 12; and FIG. 20 is a bottom oblique elevational view of a further alternative configuration of the fixture of FIG. 1.

DESCRIPTION

Figure 1:
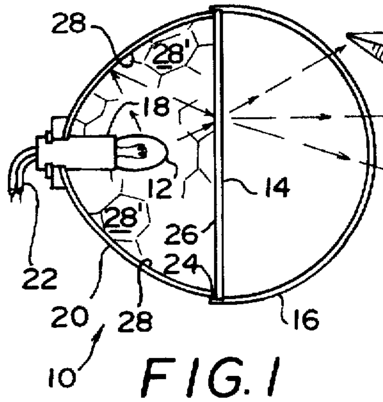
FIG. 1 is a decorative lighting fixture according to the present invention.

The present invention is directed to a decorative lighting fixture for producing colorful visual effects similar to effects that are normally produced by prismatic crystal fixtures. With reference to FIG. 1 of the drawings, a fixture 10 has a conventional incandescent lamp 12, a centrally located light-transmissive grating element 14, and a light-transmissive lens 16, the lens 16 defining a front extremity of the fixture 10. In the exemplary configuration of FIG. 1, the fixture 10 is shaped like a spherical Christmas tree ornament, a socket 18 for the lamp 12 being mounted within a quasi-hemispherical rear reflector 20, the reflector 20 defining a convex rear envelope of the fixture 10. Flexible power leads 22 extend from the rear of the socket 18 for connection in a conventional manner to a suitable source of power (not shown) together with other counterparts of the fixture 10. As further shown in FIG. 1, the lens 16 has a hemispherical shell configuration, the grating element 14 being supported at its periphery within an equatorial recess 24 of the lens 16, a front extremity of the reflector 20 also being connected against the grating element 14 and retained by the recess 24.

According to the present invention, the grating element 14 has a grating surface 26, further described below, the grating surface 26 facing the lamp 12 and being directly molded as an integral part of the element 14. The reflector 20 has a reflective surface 28 formed on its inside wall in a conventional manner. Light from the lamp 12, and as augmented by the reflective surface 28, passes through the grating element 14, the light being spatially modulated by the grating surface 26 and being further transmitted through the lens 16 as indicated by the arrows in FIG. 1. Preferably, and as indicated in FIG. 1, the reflective surface 28 forms a geodesic plurality of surface segments 28' for multiply imaging the lamp 12 through the grating surface 26, thereby enhancing the visual effect of the fixture 10. Depending on the pattern of the grating surface 26 and other factors discussed below, colorful and ornamental rainbow or spectrum-like patterns emanate from the fixture 10.

Figure 2:
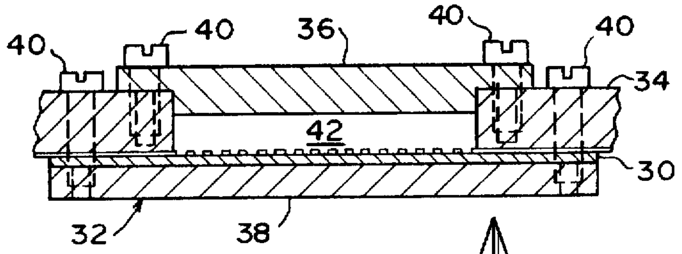
FIG. 2 is a mold assembly for a light-transmissive grating element of the fixture of FIG. 1.

With further reference to FIGS. 2–5, the grating surface 26 is molded from a tooling plate 30 that forms a part of a mold assembly 32 for molding the grating element 14, the mold assembly 32 also having a main cavity member 34, a cover 36, and a backing plate 38. As shown in FIG. 2, the tooling plate 30 is clamped between the cavity member 34 and the backing plate 38 by suitable fasteners 40. The cover 36 is also fastened to the cavity member 34 by counterparts of the fasteners 40. Thus the tooling plate 30, the cavity member 34, and the cover 36 define a mold cavity 42 for forming the grating element 14 by injection molding or by pour molding. It will be understood that the cover 36 is not necessarily required for pour molding.

Figure 3:
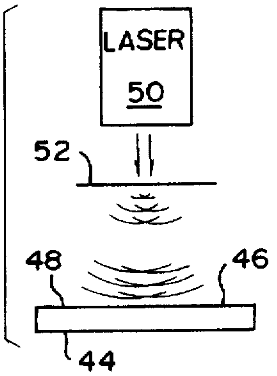
FIG. 3 is a pictorial elevational diagram of optical tooling for producing a refraction pattern on a photographic plate for the grating of FIG. 2.
Figure 4:
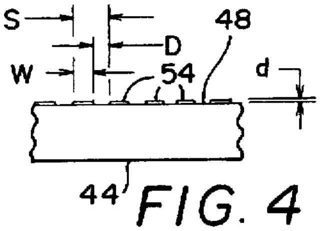
FIG. 4 is a detail sectional elevational view showing a portion of the refraction pattern of the photographic plate of FIG. 3.

The tooling plate 30 is formed against a cleaned glass plate 44 or similar member having an optical surface 46. As shown in FIG. 3, a silver-bearing photographically sensitive lotion or emulsion 48 is applied as a thin coating on the optical surface 46. The emulsion 48 is preferably applied at a selected thickness between about $0.1\times10^{-6}$ m to approximately $100\times10^{-6}$ m. A dual-beam laser 50 is directed downwardly toward the optical surface 46, a defraction mask 52 being interposed between the laser 50 and the glass plate 44 for producing a defraction pattern on the emulsion 48. The laser 50 can be an argon-iron laser having radiation at approximately 457.9 nm. Following exposure, the image of the defraction pattern is developed, leaving a thin, interrupted coating or silver on the optical surface 46. As shown in FIG. 4, the silver is in a pattern of lines 54, the lines 54 having width W, a line depth d, and a spacing S, being separated by a distance D. The spacing S is the sum of the distance D and the width W. It will be understood that the lines 54 are in general curved and intersecting, and the width W and the spacing S are typically non-uniform; yet the pattern of lines 54 is typically locally uniform and parallel. The spacing S can range from approximately $0.5\times10^{-6}$ m to approximately $100\times10^{-6}$ m, the width W and the distance D being typically half of the spacing S. The line depth d corresponds to the thickness of the emulsion 48.

Figure 5:
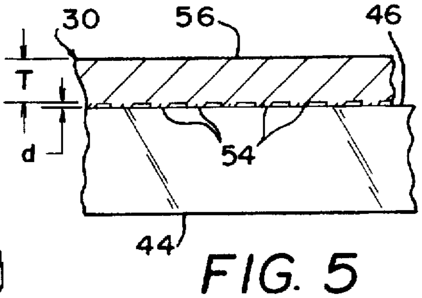
FIG. 5 is a detail sectional elevational view showing a metal tooling formed on the photographic plate of FIG. 3.

After the exposed emulsion 48 has been developed and dried, the glass plate 44 is positioned within a suitable vacuum chamber (not shown) and a thin coating of silver is vacuum-deposited onto the emulsion 48 for conductively bridging the silver lines 54. Next, a substrate 56 of a suitable metal such as nickel is electroplated onto the deposited silver as shown in FIG. 5, the backing 54 having a thickness T on the order of 2 mm or 3 mm. Finally, the completed tooling plate 30 is peeled from the glass plate 44 for use in the mold assembly 32. It will be understood that while the mold assembly 32 of FIG. 2 has the tooling plate 30 in its original flat configuration as formed on the glass plate 44, the substrate 56 can be formed cylindrically or otherwise curved for defining a correspondingly curved portion of the mold cavity 42, the cavity portion 34 and the backing plate 38 being similarly curved as required for clampingly supporting the tooling plate 30 in its curved configuration. Thus the grating surface 26 of the element 14 is defined by the silver lines 54 inwardly protruding from the substrate 56 into the mold cavity 42.

The grating element 14 can be injection molded of glass or translucent plastic such as acrylic, polyethylene, polypropylene, and polychloride. In preferred practice of the present invention, the mold cavity 42 is formed with highly reflective or polished surfaces for producing corresponding optical quality molded surfaces. Preferably the molded material is optically clear or slightly colored for a high degree of light transmission.

Thus a method for molding a light fixture lens according to the present invention includes the steps of:

(a) providing a silver-bearing photographic emulsion on an optical surface;

(b) imaging a diffraction pattern on the emulsion;

(c) developing the emulsion for forming a large plurality of metal lines on the optical surface, a multiplicity of the metal lines having a spacing of between approximately $0.5\times10^{-6}$ m and approximately $100\times10^{-6}$ m;

(d) plating a metal substrate onto the metal lines opposite the optical surface, the substrate connecting the lines in spaced relation to the optical surface;

(e) peeling the substrate, together with the metal lines, from the optical surface;

(f) fastening the substrate to a cavity member, the substrate together with the metal lines defining a portion of a mold cavity, the mold cavity extending within the cavity member;

(g) feeding a moldable material into the mold cavity;

(h) solidifying the material for forming the light fixture lens, the metal lines defining a multiplicity of surface discontinuities on a grating surface of the lens; and and (i) removing the completed lens from the cavity.

The step of plating the substrate can be performed at a substrate spacing from the optical surface of from approximately $0.1\times10^{-6}$ m to approximately $100\times10^{-6}$ m.

Figure 6:
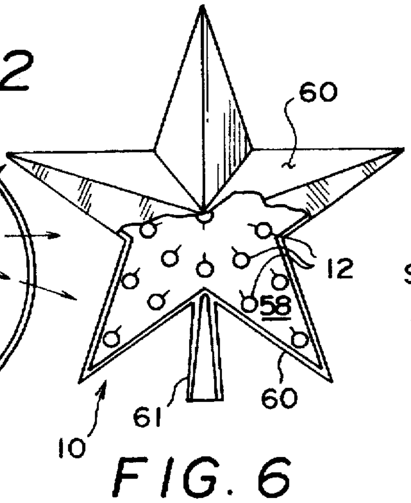
FIG. 6 is a fragmentary sectional elevational view showing an alternative configuration of the fixture of FIG. 1.
Figure 7:
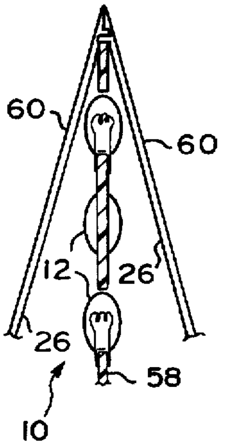
FIG. 7 is a fragmentary sectional detail view of a portion of the fixture of FIG. 6.

With further reference to FIGS. 6 and 7, an alternative configuration of the fixture 10 has an array of the lamps 12 supportively and electrically connected on a bulkhead member 58 between a pair of star-shaped counterparts of the lens 16, designated grating-lens 60. Each of the grating-lenses 60 has a counterpart of the grating surface 26 directly molded therein and facing the bulbs 12 for producing the rainbow colored effects. A depending tubular base portion 61 of the fixture 10 extends from one or both of the grating-lenses 60 for support of the fixture 10 as a Christmas tree top ornament. The colored effects are made more complex and attractive by virtue of multiple illuminating through the various portions of the grating surface 26 from the array of lamps 12.

Figure 8:
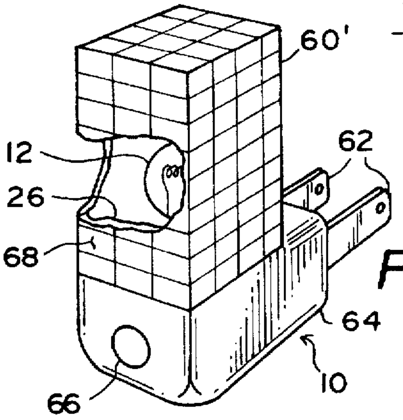
FIG. 8 is an oblique elevational perspective view showing another alternative configuration of the fixture of FIG. 1.

With further reference to FIG. 8, another configuration of the fixture 10 has a pair of conductive plug prongs 62 extending from a base member 64 for supporting and powering the fixture 10 from a conventional electrical power outlet (not shown). A counterpart of the lamp 12 extends upwardly within an upstanding counterpart of the grating-lens 60, designated 60'. The lamp 12 is activated in response to a conventional ambient light sensor 66 that is mounted to the base member 64 for operation of the fixture 10 as a safety night light fixture. As further shown in FIG. 8, the grating-lens 60 can be formed of a plurality of lens segments 68, the lens segments 68 forming planar segments that are joined at corner edges of the grating-lens 60'.

Figure 10:
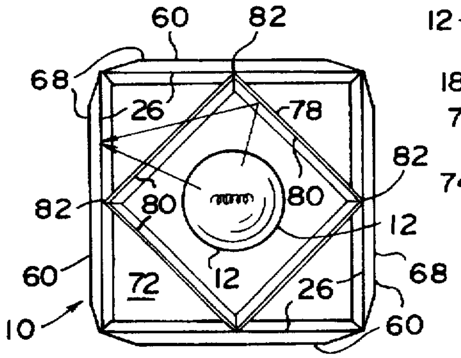
FIG. 10 is a plan sectional view showing a portion of the fixture of FIG. 9.
Figure 9:
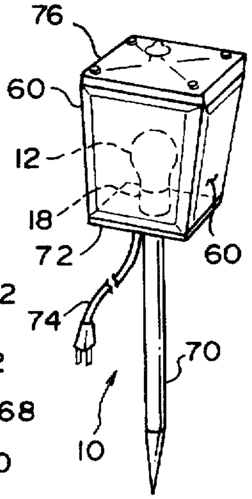
FIG. 9 is an oblique elevational perspective view showing another alternative configuration of the fixture of FIG. 1.

With further reference to FIGS. 9 and 10, the fixture 10 can be provided with a mounting post 70, the post 70 being pointed at the bottom for anchoring into the ground. The lamp 12 and its socket 18 are fastened to a bottom housing member 72 of the fixture 10, a suitable power cord 74 being connected to the socket 18 for powering the lamp 12. A plurality of planar counterparts of the grating-lens 60 are arranged in a polygonal array about the lamp 12, being supportively clamped at top and bottom edges thereof between a top housing member 76 and the bottom housing member 72 in any conventional manner. As shown in the drawings, the perimeter edges of the grating-lenses 60 are preferably beveled (by molding) for enhancing the rainbow colored effects resulting from light transmission through the grating surfaces 26.

In further accordance with the present invention, the fixture 10 of FIGS. 9 and 10 preferably includes a translucent reflector member 78 having a partially reflective surface 80 for further enhancing the visual effects by providing multiple images of the lamp 12 at at least some portions of the grating surfaces 26. For this purpose the reflector member 78 has a segmented shell configuration, forming a square prismatic enclosure of the lamp 12 and having apexes 82 proximate midpoints of the grating-lenses 60 in the exemplary configuration of FIG. 9. Thus a pair of images of the lamp 12 are formed at the grating surface 26 as indicated by the arrows in FIG. 9.

Figure 11:
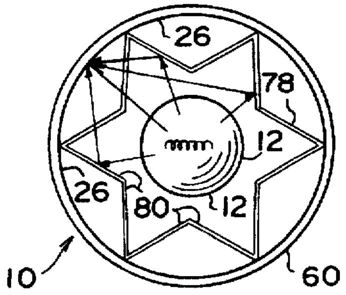
FIG. 11 is a plan sectional view as in FIG. 10, showing a further configuration of the fixture of FIG. 1.

With further reference to FIG. 11, a further variation of the fixture 10 has a cylindrically molded counterpart of the grating-lens 60 located concentrically with the lamp 12. A star-shaped counterpart of the translucent reflector member 78 surrounds the lamp 12 for forming multiple images of the lamp 12 at the grating surface 26 as indicated by the arrows in FIG. 11. The grating-lens 60 in the configuration of FIG. 11 is molded in the mold assembly 32 wherein the tooling plate 30 and the backing plate 38 are formed cylindrically and having at least a slight taper for facilitating extraction of the grating-lens 60 following molding.

With further reference to FIGS. 12–19, another alternative configuration of the fixture 10, designated chandelier fixture 10', includes a column frame 84 for suspending from a ceiling, a plurality of the lamps 12 being supported in a spaced array from the frame 84, and a plurality of counterparts of the grating-lens 60, designated pendant grating-lenses or pendants 86, the pendants 86 being supported by respective projecting wire portions 88 of the frame 84 for producing the colored effects when light from the lamps 12 is transmitted therethrough. Exemplary configurations of the grating-lenses 86 include a triangularly prismatic pendant **86*a*, shown in FIG. 13; a tri-polar pendant 86*b*, shown in FIG. 14; and a dual-triangular pendant 86*c*, shown in FIG. 15. As shown in FIG. 13, the pendant 86*a* has at its upper extremity a tab member 90 that is formed with a horizontally oriented support passage 92 therein for receiving a corresponding one of the wire portions 88, a forwardly facing side of the pendant 86*a* being formed with rearwardly beveled side faces 94*a* on opposite sides of a vertical apex 96, and rearwardly beveled end faces 94*b* that extend above and below upper and lower extremities of the apex 96. A counterpart of the grating surface 26 forms a vertically planar back face 98 that extends behind the full width and height of the front faces 94**.

As shown in FIG. 14, the tri-polar pendant **86*b* has trough-shaped concavely cylindrical counterparts of the side faces 94*a* and the back face 98 that extend between convex vertical rib extremities 100 of the pendant 86*b*. The grating surface 26 is thus substantially cylindrically concave. As used herein, the term "cylindrical" means having a surface generated by a straight line that moves parallel to a fixed line. The dual-triangular pendant 86*c* of FIG. 15 has planar counterparts of the side faces 94*a* sloping rearwardly from a spaced pair of the vertical apexes 96 for forming a pair of triangularly prismatic portions 102, the grating surface 26 being formed on a counterpart of the back face 98 that extends behind both of the prismatic portions 102**.

Another variant of the grating-lens 86, designated panel pendant **86*d* and shown in FIG. 16, has a rectangular front face 104 formed in parallel spaced relation to a corresponding counterpart of the back face 98, perimeter portions of the faces 98 and 100 being beveled from a perimeter apex 106. As shown in FIGS. 13–16, the grating surface 26 is formed on the back face 98 of each of the pendants 86*a*, 86*b*, 86*c*, and 86*d*. The panel pendant 86*d*, being symmetrical front to rear, can have the grating surface 26 formed on its front or rear faces, the surface 26 preferably extending to the perimeter apex 106**.

The chandelier fixture 10', in the exemplary configuration of FIG. 12, also includes further variants of the grating-lens 86, designated bipyramid pendant **86*e*, also shown in FIG. 17; teardrop pendant 86*f*, also shown in FIG. 18; and an octoid pendant 86*g*, shown in FIG. 19. As shown in FIGS. 17–19, each of the pendants 86*e*, 86*f*, and 86*g* is assembled from front and rear body portions 108 and 110 that are joined at a medial plane 112 by a suitable adhesive (not shown), the grating surface 26 lying in the medial plane 112, being formed in one of the body portions 108 or 110. The formation of the grating surface 26 across the full face area of the pendants 86 is thus facilitated by locating the grating surface 26 in the medial plane 112 of the pendants 86 having complex or multifaceted shaped. Preferably the material of the pendants 86 has a high refractive index for further enhancing the colored rainbow effects. It will be understood that the chandelier fixture 10' can include a plurality of the pendants 86 that are selected from any collection of pendants configured as the pendants 86*a*–86*g* of FIGS. 13–19. Thus it is contemplated that many of only one configuration of the pendants 86 can be included in the chandelier fixture 10'**.

With further reference to FIG. 20, yet another configuration of the fixture 10, designated ceiling fixture 114, has a bowl-shaped counterpart of the grating-lens 60 supported within a bezel member 116, the bezel member 116 being configured for mounting to a plane wall or ceiling surface in a conventional manner. As shown in FIG. 20, the grating-lens 60 of the fixture 114 is formed as shallow conical shell having a rounded apex portion 118, the grating surface 26 being formed as an inside surface of the grating-lens 60.

A potential problem in molding the grating element 14 and the grating-lens 60 is the possibility of damage to the grating surface 26 resulting from differential contraction of the solidified molding relative to the lines 54 of the tooling plate 30. It is contemplated that the mold assembly 32 is cooled by conventional means such as liquid passages (not shown) in the mold assembly 32 through which a suitable coolant is circulated. Preferably, the flow rate of the coolant and the temperature thereof are maintained at levels promoting enhanced cooling of the mold assembly 32 for limiting expansion of the tooling plate 30. Also, the molded part is preferably extracted from the mold assembly 32 as quickly as practicable following molding for limiting contraction of the molded part.

Although the present invention has been described in considerable detail with reference to certain preferred versions thereof, other versions are possible. The fixture 10 can have one or a pair of the grating-lenses 60 formed in a conical or bowl-shaped configuration. Also, the grating surface 26 can be molded directly in a glass envelope member of the bulb 12. The partially reflective surface of the reflector member 78 can be formed on the outwardly facing surface rather than the inwardly facing surface as described above. Further, the reflective surface 28 of the rear reflector 20 can be made partially reflective for lighting from the rear of the fixture 10, and a pair to the grating elements 14 can be mounted on opposite sides of the lamp 12. The fixture 10 of FIGS. 6 and 7 can include counterparts of the partially reflective shell member between the bulkhead member 58, and the bulkhead member can also be made fully or partially reflective for generating multiple images of the lamps 12. The frame 84 can be adapted for wall mounting by configuring the pendants 86 in one or more semicircular array portions. Moreover, the grating surface 26 can be formed by permanent deformation of a formable material by the tooling plate 30. In particular, the tooling plate 30 can be formed as a cylindrical segment or as a complete cylinder, the lines 54 being impressed into the grating element 14 or the grating-lens 60 and forming corresponding discontinuities of the grating surface 26 as the tooling plate 30 is rolled. For this operation, the material to be formed by the tooling plate 30 is maintained at an appropriate intermediate temperature for facilitating plastic flow between the lines 54. Therefore, the spirit and scope of the appended claims should not necessarily be limited to the description of the preferred versions contained herein.

What is claimed is:

1. A method of making decorative light fixture, the decorative light fixture including a light source and a translucent member and a grating element for spatially modulating light from the light source which passes through the translucent member to thereby form a diffraction pattern, said grating having a spacing of between approximately $0.5\times10^{-2}$ m and approximately $100\times10^{-6}$ m, comprising the steps of:

(a) forming a tooling plate having a grating pattern;

(b) providing a mold assembly which includes a main cavity member, a baking plate, and a tooling plate;

(c) clamping the tooling plate between the cavity member and the backing plate to define a mold for forming the translucent member by molding;

(d) forming the grating element by integrally molding the grating element into the translucent member; and (e) positioning between the light source and the grating element a means for causing light passing from the light source to the grating pattern to form multiple light source images before through the grating pattern.

2. A method as claimed in claim 1, wherein step (a) further comprises the step of forming the tooling plate by applying a photosensitive material as a coating on an optical surface, directing a laser downwardly toward the optical surface through a diffraction mask to exposed portions of the photosensitive material and thereby produce a diffraction pattern in the photosensitive material, developing and drying the photosensitive material to expose the diffraction pattern, applying a thin coating of silver on the exposed photosensitive material, electroplating a substrate on the coated exposed photosensitive material, peeling the exposed photosensitive material, silver coating, and substrate from the optical surface to form said tooling plate.

3. A method as claimed in claim 1, wherein step (b) further comprises the step of providing a cover for the mold assembly and step (d) comprises the step of injection molding the translucent member together with the grating element.

4. A method as claimed in claim 1, wherein step (d) comprises the step of molding the translucent member together with the grating element by pouring a moldable translucent material into said mold.

5. A method as claimed in claim 1, wherein the optical surface is a curved surface to thereby cause the tooling plate, and consequently the translucent member, to have a curved surface.

6. A method as claimed in claim 1, wherein step (e) comprises the step of attaching the translucent member to a reflective member having a plurality of reflective segments with the light source being positioned between the grating and the plurality of reflective segments.

7. A method as claimed in claim 6, wherein said plurality of reflective segments are arranged to form a geodesic reflective surface.

8. A method as claimed in claim 1, wherein step (e) comprises the step of providing in said light fixture a plurality of light sources and positioning the grating such that light from each of the plurality of light sources passes through the grating.

9. A method as claimed in claim 1, wherein said light fixture comprises a plurality of translucent members and grating elements formed by steps (a)–(e), wherein step (e) comprises the step of forming said translucent members into prismatic shapes.

10. A method as claimed in claim 9, further comprising the step of hanging a plurality of translucent members having a grating element and prismatic shapes to position the translucent members relative to the light source and cause images of the light sources to be multiplied before passing through the gratings, whereby the light source and translucent members provide an appearance of a crystal chandelier.

* * * * *